US007543337B2

(12) United States Patent
D'Agnolo

(10) Patent No.: US 7,543,337 B2
(45) Date of Patent: Jun. 2, 2009

(54) SYSTEM AND METHOD FOR AUTOMATIC VERIFICATION OF THE HOLDER OF AN AUTHORIZATION DOCUMENT AND AUTOMATIC ESTABLISHMENT OF THE AUTHENTICITY AND VALIDITY OF THE AUTHORIZATION DOCUMENT

(75) Inventor: Carlo Antonio Giovanni D'Agnolo, Nuenen (NL)

(73) Assignee: Enschede/SDJ B.V. (NL)

( * ) Notice: Subject to any disclaimer, the term of this patent is extended or adjusted under 35 U.S.C. 154(b) by 282 days.

(21) Appl. No.: 10/518,415

(22) PCT Filed: Jun. 19, 2003

(86) PCT No.: PCT/NL03/00447

§ 371 (c)(1),
(2), (4) Date: Aug. 16, 2005

(87) PCT Pub. No.: WO2004/017265

PCT Pub. Date: Feb. 26, 2004

(65) Prior Publication Data

US 2006/0179481 A1 Aug. 10, 2006

(30) Foreign Application Priority Data

Jun. 19, 2002 (NL) .................................... 1020903

(51) Int. Cl.
*G06K 9/00* (2006.01)
*G06F 17/30* (2006.01)
*H04L 9/32* (2006.01)
*H04K 1/00* (2006.01)

(52) U.S. Cl. ............................... 726/30; 726/9; 726/20; 726/27; 380/228; 380/229; 713/185; 713/186

(58) Field of Classification Search .................... 726/20
See application file for complete search history.

(56) References Cited

U.S. PATENT DOCUMENTS 4,897,747 A 1/1990 Meunier et al.
5,694,471 A * 12/1997 Chen et al. .................... 705/76
5,872,848 A * 2/1999 Romney et al. ............. 713/176

(Continued)

FOREIGN PATENT DOCUMENTS

GB 2 348 309 A 9/2000

(Continued)

OTHER PUBLICATIONS

Noore, Afzel, "Highly Robust Biometric Smart Card Design," IEEE Transactions on Consumer Electronics, Nov. 2000, vol. 46, Issue 4, pp. 1059-1063.*

(Continued)

*Primary Examiner*—Kaveh Abrishamkar
(74) *Attorney, Agent, or Firm*—Greenberg Traurig, LLP

(57) ABSTRACT

System for reading a document provided with machine-readable holder details and establishing whether a person presented the document has a predetermined right, which document at least contains a chip containing biometric data on a holder as well as data with a predetermined relationship to the holder details, and wherein the system comprises: a reader for reading the chip and the machine-readable holder details; a memory containing details with regard to the right of the holder; a biometric feature scanner; a processing unit connected to reader, memory and scanner and equipped to: establish the authenticity of chip and data using public key encryption technology; receive the biometric data on the holder from the chip; receive the biometric data on the person presenting the document from the scanner and to compare these with the data on the holder to determine whether the person presenting the document is the holder; receive the holder details via the reader, check the relationship between the holder details and the data and read the right of the holder from the memory; provide a signal to indicate the right for the person presenting the document if the chip and the data arc authentic, the relationship has been established and the person presenting the document is the same as the holder.

10 Claims, 2 Drawing Sheets

U.S. PATENT DOCUMENTS

| | | | |
|---|---|---|---|
| 6,044,349 A | 3/2000 | Tolopka et al. | |
| 6,219,439 B1 * | 4/2001 | Burger | 382/115 |
| 6,240,517 B1 | 5/2001 | Nishioka | |
| 6,321,981 B1 | 11/2001 | Ray et al. | |
| 6,775,775 B1 | 8/2004 | Yoshiura et al. | |
| 7,051,205 B1 | 5/2006 | Horiguchi et al. | |
| 7,172,115 B2 * | 2/2007 | Lauden | 235/380 |
| 2001/0054951 A1 | 12/2001 | Kimoto et al. | |
| 2005/0154877 A1 * | 7/2005 | Trench | 713/156 |

FOREIGN PATENT DOCUMENTS

| | | |
|---|---|---|
| GB | 2 354 612 A | 3/2001 |
| JP | 10149103 | 6/1998 |
| JP | 10222618 | 8/1998 |
| JP | A-2000-200337 | 7/2000 |
| JP | A-2000-215171 | 8/2000 |
| JP | A-2000-358026 | 12/2000 |
| JP | A-2001-266187 | 9/2001 |
| JP | 2001357377 | 12/2001 |
| JP | 2002008070 | 1/2002 |
| JP | 2002072872 | 3/2002 |
| WO | WO 01 20564 A | 3/2001 |
| WO | WO 01/54346 A1 | 7/2001 |
| WO | WO 01 78021 | 10/2001 |
| WO | WO 02 11078 A | 2/2002 |
| WO | WO 2004/019188 A2 * | 4/2004 |

OTHER PUBLICATIONS

International Search Report (EPO) of Sep. 4, 2003.

* cited by examiner

SYSTEM AND METHOD FOR AUTOMATIC VERIFICATION OF THE HOLDER OF AN AUTHORIZATION DOCUMENT AND AUTOMATIC ESTABLISHMENT OF THE AUTHENTICITY AND VALIDITY OF THE AUTHORIZATION DOCUMENT

PRIOR ART

The system and the method to which the invention relates is applied in particular in checking passports at a border crossing. However, the invention can also be employed when obtaining access to a specific location or area or acquiring the right to access a system, such as a computer or a terminal, etc.

The method that is generally followed by an official at a border crossing is as follows:

A. Checking the authenticity of a travel document and checking the authenticity of the information contained in the travel document, such as a passport, by looking at authenticity characteristics;

B. Verification whether the document that is being presented belongs to the person who is offering it (holder) by comparing the passport photograph and/or signature;

C. Checking the validity of the document and permission to cross the border by typing in the passport number and/or the name of the holder for comparison with a database containing a stop register, that is to say a register containing a list of passport numbers and/or the names of holders who are not authorised to cross the border.

The use of biometry on a passport, supplementary to a passport photograph and signature, is also known and serves to support step B, verification of the document holder. Known biometric methods, which can also be used with the invention, comprise, for example, the use of one or more of the following personal characteristics (biometric template): eyes (iris), voice, handprints, fingerprints, face and handwritten signatures.

An obvious embodiment of a travel document with biometry is storage of the biometric template on the document. This can be, for example, in a 2D barcode, on a magnetic strip or in a chip.

In the case of automatic checking a disadvantage of this is that the biometric template is linked to the personal details. This can be undesirable in connection with privacy. Another disadvantage is that a biometric template can be added to a travel document by an unauthorised person so that this unauthorised person is unjustifiably able to cross a border. It is also possible to present any arbitrary other (fake) document with a biometric template. These forms of fraud then remain undetected in the case of automatic checking.

BRIEF SUMMARY OF THE INVENTION

The aim of the invention is therefore to provide a system that does not have the abovementioned disadvantages.

To this end the invention first of all provides a system for reading a document provided with machine-readable holder details and establishing whether a person presenting the document has a predetermined right, which document at least contains a chip containing biometric data on a holder as well as data with a predetermined relationship to the holder details, and wherein the system comprises:

a reader for reading the chip and the machine-readable holder details;

a memory containing details with regard to the predetermined right of the holder;

a biometric feature scanner;

a processing unit that is connected to the reader; the memory and the biometric feature scanner and is equipped to:

establish the authenticity of the chip and the data with the aid of a public key encryption technology;

receive the biometric data on the holder from the chip, from the reader;

receive the biometric data on the person presenting the document from the biometric feature scanner and to compare these with the biometric data on the holder to determine whether the person presenting the document is the holder;

receive the holder details via the reader, check the predetermined relationship between the holder details and the data and read the predetermined right of the holder from the memory;

provide a signal to indicate the predetermined right for the person presenting the document if the chip and the data are authentic, the predetermined relationship has been established and the person presenting the document is the same as the holder.

In one embodiment the invention relates to a method for reading a document provided with machine-readable holder details and establishing whether a person presenting the document has a predetermined right, which document contains at least one chip containing biometric data on a holder as well as data having a predetermined relationship to the holder details, and wherein the system comprises a reader for reading the chip and the machine-readable holder details, a memory containing data on the predetermined right of the holder, a biometric feature scanner and a processing unit that is connected to the reader, the memory and the biometric feature scanner, wherein the method comprises the following operations:

establishment of the authenticity of the chip and the data with the aid of a public key encryption technology;

receipt of the biometric data on the holder from the chip;

receipt of the biometric data on the person presenting the document and comparison with the biometric data on the holder to determine whether the person presenting the document is the holder;

receipt of the holder details, checking of the specific relationship between the holder details and the data and reading the predetermined right of the holder from the memory, provision of a signal to indicate the predetermined right for the person presenting the document if the chip and the data are authentic, the predetermined relationship has been established and the person presenting the document is the same as the holder.

In a further embodiment the invention relates to a computer program that can be loaded by a system for reading a document provided with machine-readable holder details and establishing whether a person presenting the document has a predetermined right, which document contains at least one chip containing biometric data on a holder as well as data having a predetermined relationship to the holder details, and wherein the system comprises a reader for reading the chip and the machine-readable holder details, a memory containing data on the predetermined right of the holder, a biometric feature scanner and a processing unit that is connected to the reader, the memory and the biometric feature scanner, wherein the computer program can provide the system with the following functionality:

establishment of the authenticity of the chip and the data with the aid of a public key encryption technology, receipt of the biometric data on the holder from the chip;

receipt of the biometric data on the person presenting the document and comparison with the biometric data on the holder to determine whether the person presenting the document is the holder;

receipt of the holder details, checking of the specific relationship between the holder details and the data and reading the predetermined right of the holder from the memory;

provision of a signal to indicate the predetermined right for the person presenting the document if the chip and the data are authentic, the predetermined relationship has been established and the person presenting the document is the same as the holder.

In yet a further embodiment the invention relates to a carrier provided with such a computer program.

Finally, the invention also relates to a document provided with machine-readable holder details and a chip, which chip is provided with a processing unit and memory connected thereto and an input/output unit, wherein the memory contains biometric data on a holder, as well as data that have a predetermined relationship to the holder details, as well as instructions for making the processing unit carry out the following operations:

communication with a system according to claim 1 to enable the authenticity of the chip to be established with the aid of a public key encryption technology;

transmission of the biometric data on the holder and the data from the memory to the system;

By means of the invention it is possible automatically to establish that the document is authentic and that the person presenting the document actually is the holder thereof.

DESCRIPTION OF THE FIGURES

The invention will be described in brief with reference to a few figures that are intended solely for the purposes of illustration thereof and not to restrict the scope thereof, which is restricted only by the appended claims and their equivalents.

DESCRIPTION OF EMBODIMENTS

The invention will now be described with reference to the use of a passport as travel document. As stated above, the invention can, however, be applied more widely, specifically wherever someone has to acquire a specific right in order to be able to do something.

Figure 1:
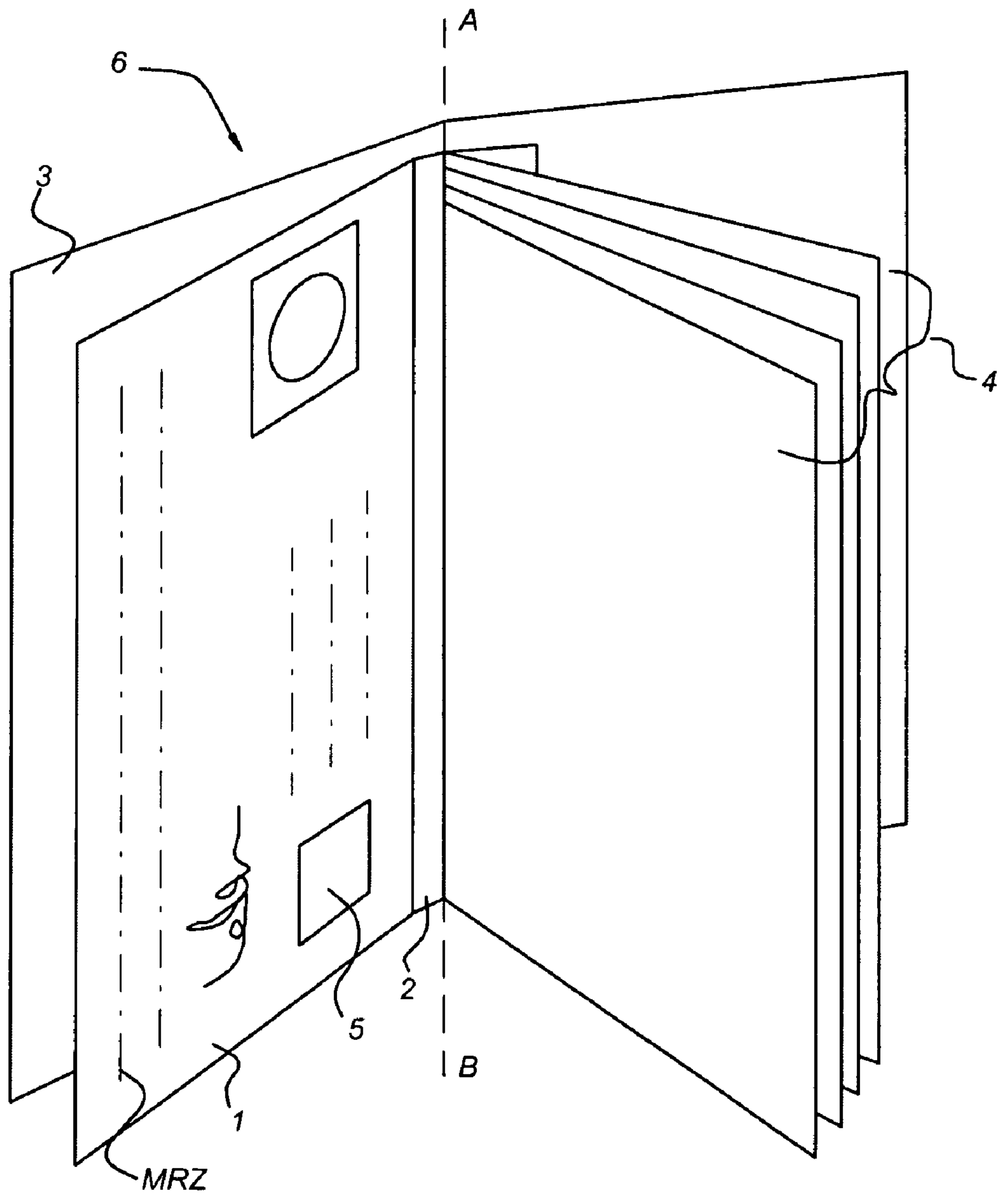
FIG. 1 shows a document, in the form of a booklet, for example a passport, in which there is a chip containing biometric data.

FIG. 1 shows the application of the invention in the case of a passport 6. With the exception of chip 5, the passport 6 as shown in FIG. 1 has been described in detail in European Patent Application EP-A 1 008 459. The passport as described in this publication, including all its embodiments, can be used with the present invention. The passport 6 contains a card 1 provided with text, a passport photograph and a signature. The card 1 can, for example, be made of synthetic laminate. The card 1 is fixed to a strip 2 that ensures that the card can be retained in the form of a booklet. Machine-readable holder details are provided on the card 1.

The booklet contains further pages 4, suitable, for example, for recording visas for visits to countries. The booklet also has a cover 3. The reader is referred to European Patent Application EP-A 1 008 459 for further details and embodiments.

It is also pointed out that the invention can be used with other types of documents, but that use with a passport (or other travel document) is particularly advantageous because to date no watertight check for the authenticity of the document as well as verification of the person presenting the document has been found for this purpose.

In accordance with the invention, the card 1 contains a chip 5. The chip is preferably integrated in the card 1 in such a way that this chip 5 cannot be removed without damaging the card 1.

Figure 3:
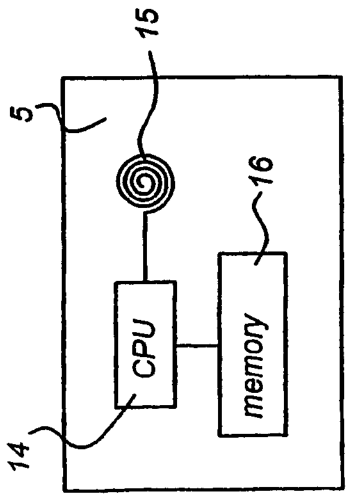
FIG. 3 shows, diagrammatically, a chip such as can be incorporated in the document according to FIG. 1.

FIG. 3 shows one embodiment of such a chip 5. The chip 5 comprises a processing unit (CPU) 14, that is connected to a memory 16 as well as input/output unit 15.

The memory comprises, for example, ROM and a non-volatile memory, such as an EEPROM, but other types of memory can also be used. At least the following are stored in the memory: a private key (preferably in ROM, so that this cannot be changed), a biocertificate and (optionally) a certificate from an issuing authority. The biocertificate contains biometric feature data on the holder of the passport and data that have a predetermined relationship with the machine-readable data.

Figure 2:
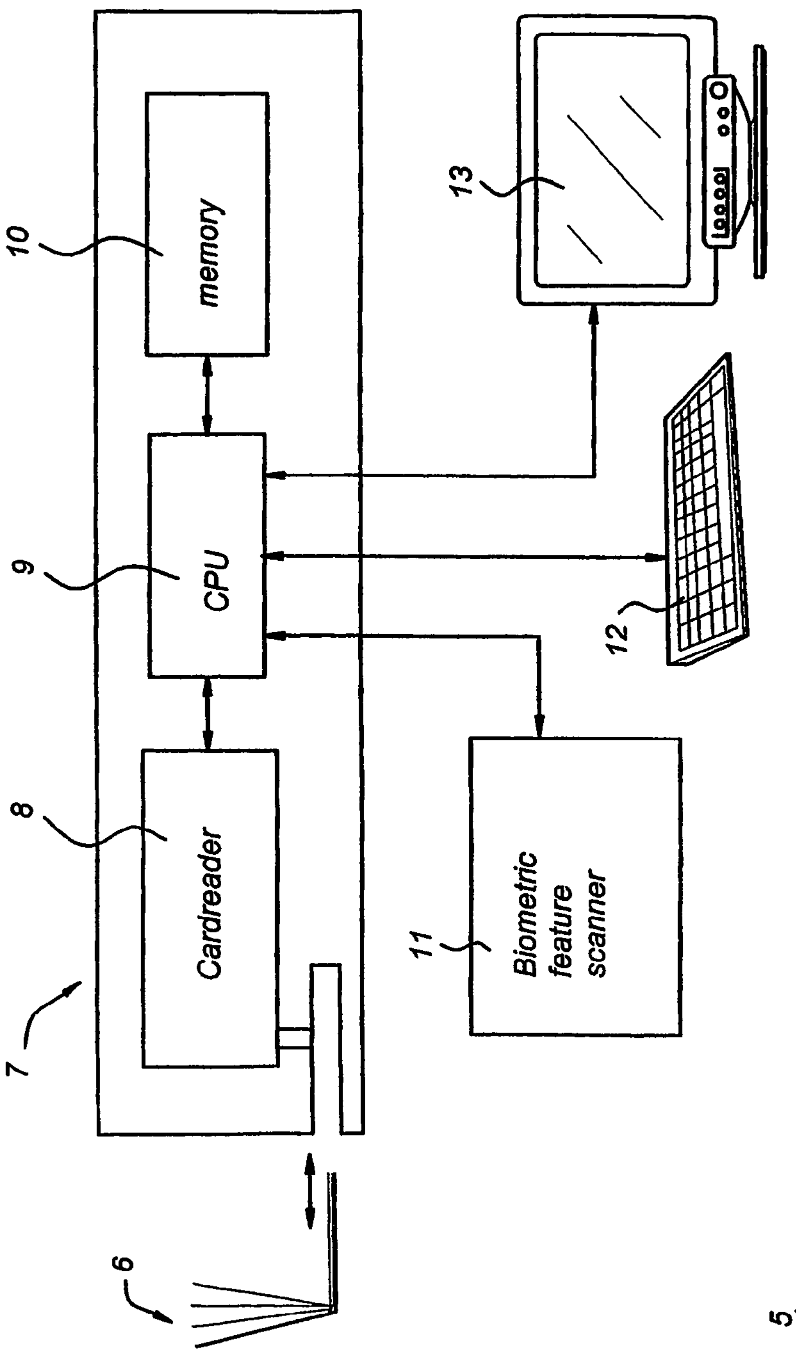
FIG. 2 shows a system by means of which the document as shown in FIG. 1 can be read and evaluated.

The input/output unit 15 is preferably suitable for contact-free communication with the system that is shown in FIG. 2. For this purpose the input/output unit 15 can preferably be made in the form of a circular antenna, as is shown in FIG. 3. However, other embodiments are possible. Contact surfaces, such as are known from current chip cards, are also possible.

It should be clear that FIG. 3 shows only one embodiment. If desired, several processing units can have been provided, as well as several forms of memories and several input/output units. Preferably, the chip 5 receives its power supply from the system that is shown in FIG. 2 during communication therewith. For this purpose the chip 5 is therefore designed as a transponder unit. Such a transponder unit is known to those skilled in the art and does not have to be explained in detail here. Of course, a battery can be provided instead of this, although in the majority of cases this is highly impractical.

FIG. 2 shows a system 7 for reading the chip 5 applied to the passport 6. For this purpose the system according to FIG. 2 is equipped with a card reader 8, which is provided with a chip reader in order to communicate with the chip 5 on the card 1, and a reader for reading the holder's details which, for example, are provided in a "machine readable zone" (MRZ) of the card 1.

The card reader 8 is connected to a processing unit (CPU) 9. The CPU 9 is connected to a memory 10.

The system 7 is also connected to a biometric feature scanner 11, as well as a keyboard 12 and a screen 13. The biometric feature scanner 11 is equipped to be able to scan a biometric feature of a person presenting the document 6. Such a scanner 11 can be, for example, an iris scanner or a device for reading a fingerprint from the person presenting the passport. Such biometric feature scanners 11 are known in the art and do not need to be described in detail here.

The structure of the system 7 from FIG. 2 is arbitrary. If desired, all components can be accommodated in one cabinet. However, some components can also be housed in separate cabinets if desired. Apart from the keyboard 12, a mouse or other input/output means that are known to those skilled in the art can, for example, also be provided. The screen 13 can have any desired shape and can be of any desired type that is currently obtainable on the market (or will be so in the future).

It is indicated in FIG. 2 that there is a memory 10. This memory can consist of RAM, ROM, EEPROM, a hard disk, etc., etc. The processing unit 9 can consist of a single unit but also of several units which may or may not be arranged in parallel or in a master/slave relationship. As a further alternative, various components can be installed remotely from one another. The memory 10 can, for example, be located a great distance away, if this is desirable.

The mode of operation of the system according to FIG. 2 will now be explained with reference to a number of operations.

1. The passport 6 is submitted to the card reader 8 for reading the holder's details from the MRZ and reading data from the chip 5 on the passport 6;
2. The data read are transmitted to the CPU 9;
3. The CPU 9 transmits a random challenge code via the chip reader to the chip 5 to check the authenticity of chip 5 and requests the chip 5 digitally to sign or to encode this with the private key stored on the chip 5 belonging to the biocertificate stored on said chip;
4. The chip 5 then transmits the challenge code encoded or digitally signed with the private key back to the CPU 9. The encoded or digitally signed challenge code is the digital response. The chip 5 also transmits the biocertificate, as stored on the chip, signed with the private key of the issuing authority to the CPU 9. Optionally, the certificate from the authority that has issued the passport is also transmitted by the chip 5 to the CPU 9. The sequence in which these data are transmitted by the chip 5 to the CPU 9 is arbitrary. It is also not absolutely essential to make use of one private key,
5. With the aid of the certificate from the issuing authority, the CPU 9 checks whether the biocertificate and the data that have been stored therein are authentic;
6. With the aid of the biocertificate, the CPU 9 checks whether the digital response is correct;
7. Data are stored in the biocertificate which can be used to check the relationship between the biocertificate and the holder's details. This can be, for example, by hashing the holder's details. The CPU 9 checks the relationship between the biocertificate and the holder's details with the aid of the data in the biocertificate and the holder's details. The authenticity of the holder's details is also established by this means.
8. The biometric feature of the person presenting the passport is read by the biometric feature scanner 11 and this scanner transmits the data to the CPU 9. The CPU 9 converts these data into a biometric template (of course, the functionality for the conversion thereof can also be incorporated in the biometric feature scanner 11 by providing this with suitable intelligence for this purpose);
9. The CPU 9 checks, preferably via a one-way function (for example a hashing function), whether the passport number and/or the holder are listed in the stop register stored in memory 10 and reports this to the official, for example via screen 13;
10. The CPU 9 checks whether the biometric template obtained from operation 8 corresponds to the biometric template from the biocertificate received from the chip 5; the official will be informed of the result of this check, preferably via screen 13.

The invention eliminates the disadvantages that arise in the case of the "state of the art". Specifically, it is possible by means of the abovementioned operations to check that both the passport and the holder's details are authentic and that the person presenting the passport is also actually the holder thereof. That is to say, secure automatic border control becomes possible by this means, which has not (yet) been the case to date.

By making use of the "biocertificate", the biometric template is not directly linked to the personal details. This is partly the case because the relationship between the biocertificate and the holder's details (for example the data in the MRZ) are linked to one another by a one-way function (hashing).

The authenticity of the information carrier (chip) is checked by signing the challenge code with the private key. The private key cannot be copied. By means of checking the biocertificate against the biometric template and the check on the authenticity of the chip 5, fraud is virtually precluded in the case of an automatic check. Moreover, chip 5 and the passport 6 are joined to one another such that they cannot be separated, as a result of which manipulation of the chip 5 becomes impossible without causing discernible damage.

The invention claimed is:

1. System for reading a document comprising a card provided with machine-readable holder details in a machine readable zone and for establishing whether a person presenting the document has a predetermined right, the machine readable zone being provided on the external surface of the card and which document at least contains a chip containing one or more private keys and a biocertificate containing biometric data on the holder as well as data with a predetermined relationship to the machine readable holder details in the machine readable zone which predetermined relationship is based on a one-way function, and wherein the system comprises:

- a reader for reading the chip and for reading the machine-readable holder details in the machine readable zone;
- a memory containing details with regard to the predetermined right of the holder;
- a biometric feature scanner arranged to scan a biometric feature of the holder and to generate scanned biometric data;
- a processing unit that is connected to the reader, the memory and the biometric feature scanner and is equipped to:
  - establish the authenticity of the chip by transmitting a random challenge code to the chip, receiving a digitally signed random challenge code from the chip that is obtained by digitally signing said random challenge code by said chip using one of said one or more private keys and checking the digitally signed challenge code with a certificate from an issuing authority,
  - establish the authenticity of the data in the biocertificate by receiving digitally signed biocertificate data that is obtained by digitally signing said data in said biocertificate by said chip using one of said one or more private keys and checking the digitally signed biocertificate data with the certificate from said issuing authority, and receive the scanned biometric data on the person presenting the document from the biometric feature scanner and to compare these with the biometric data on the holder from the chip as present in said digitally signed biocertificate data to determine whether the person presenting the document is the holder;
  - receive the machine readable holder details in the machine readable zone as read by the reader from the external surface of the card, check said one-way functional relationship between the machine readable holder details and the data in said chip having said one-way functional relationship to the machine readable holder details in order to authenticate the machine readable holder details in the machine readable zone;

read the predetermined right of the holder from the memory; and provide a signal to indicate the predetermined right for the person presenting the document if the chip, the biocertificate data and the machine readable holder details are authentic, the predetermined relationship has been established and the person presenting the document is the same as the holder.

2. System according to claim 1, wherein the document is a travel document.

3. System according to claim 1, wherein the one-way function is a hashing function.

4. Document comprising a card provided with machine-readable holder details in a machine readable zone and for establishing whether a person presenting the document has a predetermined right and a chip, the machine readable zone being provided on the external surface of the card and which chip is provided with a processing unit and memory connected thereto and an input/output unit, wherein the memory contains one or more private keys and a biocertificate containing biometric data on a holder, as well as data that have a predetermined relationship to the machine readable holder details in the machine readable zone which predetermined relationship is based on a one-way function, as well as instructions for making the processing unit carry out the following operations:

communication with a system according to claim 1 to enable the authenticity of the chip and of said data in said biocertificate to be established with the aid of a public key encryption technology by performing the following operations:

receiving a random challenge code, digitally signing said random challenge code using one of said one or more private keys rendering a digitally signed random challenge code and transmitting said digitally signed random challenge code via said input/output unit to said system, digitally signing said data in the biocertificate using one of said one or more private keys rendering digitally signed biocertificate data and transmitting said digitally signed biocertificate data via said input/output unit to said system.

5. Document according to claim 4, wherein the document is a travel document.

6. Document according to claim 5, wherein the chip is an integral part of the travel document.

7. Document according to claim 4, wherein the input/output unit is equipped for contact-free communication.

8. Document according to claim 4, wherein the chip is equipped as a transponder unit.

9. Method for reading a document comprising a card provided with machine-readable holder details in a machine readable zone and for establishing whether a person presenting the document has a predetermined right, the machine readable zone being provided on the external surface of the card and which document contains at least a chip containing one or more private keys and a biocertificate containing biometric data on a holder as well as data with a predetermined relationship to the machine readable holder details in the machine readable zone which predetermined relationship is based on a one-way function, and wherein the method comprises:

establishing authenticity of the chip by transmitting a random challenge code to the chip, receiving a digitally signed random challenge code from the chip that is obtained by digitally signing said random challenge code by said chip using one of said one or more private keys and checking the digitally signed challenge code with a certificate from an issuing authority;

establishing the authenticity of the data in the biocertificate by receiving digitally signed biocertificate data that is obtained by digitally signing said data in said biocertificate by said chip using one of said one or more private keys and checking the digitally signed biocertificate data with the certificate from said issuing authority;

receiving scanned biometric data on the person presenting the document from a biometric feature scanner and to compare these with the biometric data on the holder from the chip as present in said digitally signed biocertificate data to determine whether the person presenting the document is the holder;

receiving the machine readable holder details in the machine readable zone as read by a reader from the external surface of the card, checking said one-way functional relationship between the machine readable holder details and the data in said chip having said one-way functional relationship to the machine readable holder details in order to authenticate the machine readable holder details in the machine readable zone;

reading the predetermined right of the holder from a memory; and providing a signal to indicate the predetermined right for the person presenting the document if the chip, the biocertificate data and the machine readable holder details are authentic, the predetermined relationship has been established and the person presenting the document is the same as the holder.

10. Data carrier device comprising a computer program that can be loaded by a system for reading a document comprising a card provided with machine-readable holder details in a machine readable zone and for establishing whether a person presenting the document has a predetermined right, the machine readable zone being provided on the external surface of the card and which document at least contains a chip containing one or more private keys and a biocertificate containing biometric data on the holder as well as data with a predetermined relationship to the machine readable holder details in the machine readable zone which predetermined relationship is based on a one-way function, and wherein the computer program can provide the system with the following functionality:

establishing the authenticity of the chip by transmitting a random challenge code to the chip, receiving a digitally signed random challenge code from the chip that is obtained by digitally signing said random challenge code by said chip using one of said one or more private keys and checking the digitally signed challenge code with a certificate from an issuing authority;

establishing the authenticity of the data in the biocertificate by receiving digitally signed biocertificate data that is obtained by digitally signing said data in said biocertificate by said chip using one or said one or more private keys and checking the digitally signed biocertificate data with the certificate from said issuing authority;

receiving scanned biometric data on the person presenting the document from a biometric feature scanner and to compare these with the biometric data on the holder from the chip as present in said digitally signed biocertificate data to determine whether the person presenting the document is the holder;

receiving the machine readable holder details in the machine readable zone as read by a reader from the external surface of the card, checking said one-way functional relationship between the machine readable holder details and the data in said chip having said one-way functional relationship to the machine readable holder details in order to authenticate the machine readable holder details in the machine readable zone;

reading the predetermined right of the holder from a memory; and providing a signal to indicate the predetermined right for the person presenting the document if the chip, the biocertificate data and the machine readable holder details are authentic, the predetermined relationship has been established and the person presenting the document is the same as the holder.

* * * * *

UNITED STATES PATENT AND TRADEMARK OFFICE

CERTIFICATE OF CORRECTION

PATENT NO. : 7,543,337 B2
APPLICATION NO. : 10/518415
DATED : June 2, 2009
INVENTOR(S) : Carlo Antonio Giovanni D'Agnolo It is certified that error appears in the above-identified patent and that said Letters Patent is hereby corrected as shown below:

On the Title Page
Item (73) Assignee, please delete "Enschede/SDJ B.V. (NL)" and insert --Enschede/SDU B.V. (NL)-- therefor, to read Item "(73) Assignee: Enschede/SDU B.V. (NL)"

Signed and Sealed this

Twenty-fifth Day of August, 2009

David J. Kappos
*Director of the United States Patent and Trademark Office*